April 28, 1959 G. E. S. TOMLINSON 2,884,105
CONICAL FRICTION CLUTCHES
Filed June 12, 1956
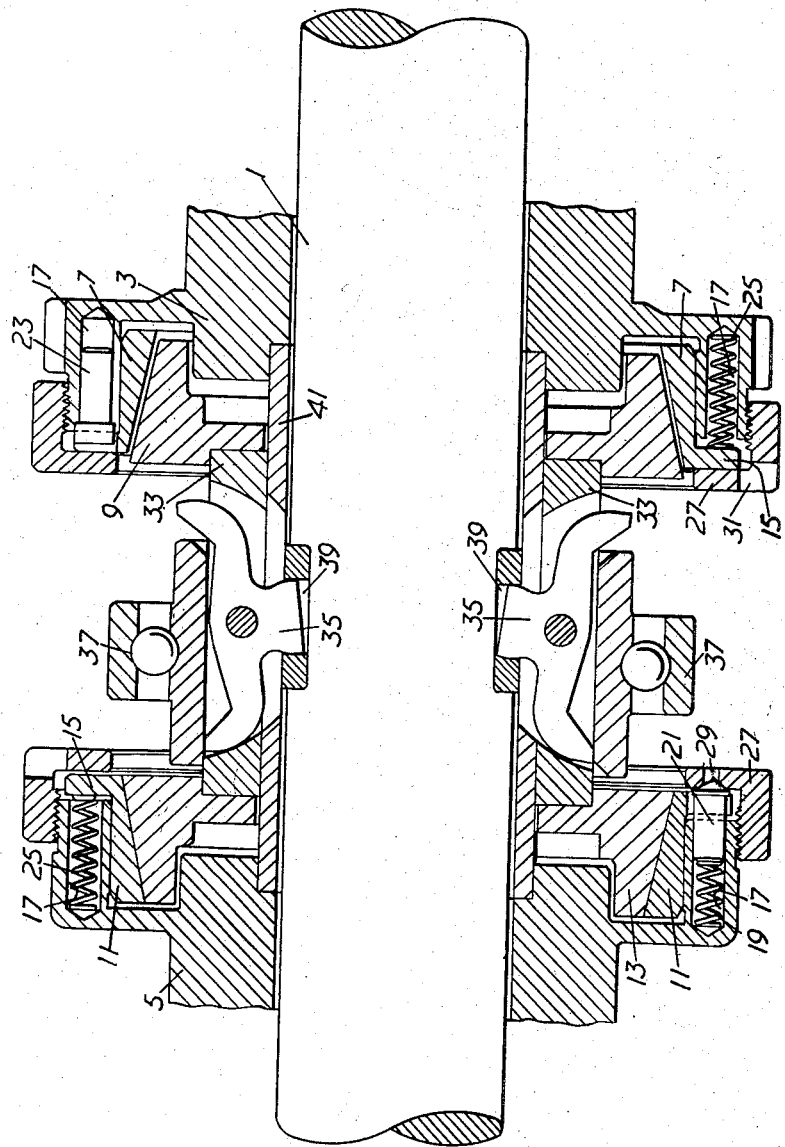
Inventor
Geoffrey E. S. Tomlinson
By
Attorneys

United States Patent Office 2,884,105
Patented Apr. 28, 1959

2,884,105

CONICAL FRICTION CLUTCHES

Geoffrey E. S. Tomlinson, Cardiff, Wales, assignor to The Birmingham Small Arms Company Limited, Birmingham, England, a British company Application June 12, 1956, Serial No. 590,927

Claims priority, application Great Britain June 17, 1955

3 Claims. (Cl. 192—66)

This invention relates to conical friction clutches of the kind adapted for use on machine tools for the purpose of providing a quick reverse or a change of speed of rotation of the work spindle.

Clutches of the kind referred to comprise pairs of outer friction cones freely mounted on the work spindle and adapted to be independently driven when clutched thereto by means of an inner double cone clutch member which is longitudinally slidable on the work spindle and adapted to be moved into engagement with either of the outer friction cones, whereby the work spindle can be driven at different speeds and in a forward or reverse direction. The inner double cone clutch member has a longitudinal movement imparted thereto by means of rocking levers pivotally carried on the inner clutch member and adapted to be engaged by a longitudinally movable clutch operating sleeve which when moved by a pivoted control lever engages with and depresses one arm of the rocking levers. On the underside of the rocking levers is a lug or projection which is adapted to engage with a slot or gap in the work spindle, said lug constituting a fulcrum for the rocking levers which imparts to the inner cone clutch member a longitudinal movement for engagement with one of the rotating outer cone clutch members whereby movement is imparted to the work spindle.

Usually a cone clutch of the aforesaid kind is normally adjusted by means of a threaded connection between the inner and outer friction cones whereby the amount of load applied between the cones can be varied. This method is however somewhat crude, and frequently results in the clutches being overloaded. Further, by this method of adjustment a considerable difference in clutch tension occurs between the starting up of a machine when cold and when it has been run up to working temperature. Consequently clutches tightened up when the machine is started cause an overloading when the machine becomes hot. It is an object of the present invention to provide an improved construction and arrangement of clutch mechanism which overcomes the aforesaid objection.

According to this invention the outer cones of a friction clutch of the kind specified are spring loaded in such manner as to constitute a resilient connection between the driving member and the outer cone member.

Preferably the spring loaded cone is prevented from moving axially away from the spring loading, particularly during disengagement by means such as a lock-nut, which may conveniently be adjustable to compensate for wear on the cone faces.

Such a lock-nut may be provided with apertures to enable the clearance to be easily gauged.

The lock-nut may be arranged to be held in any one position conveniently by a spring loaded detent operating in a recess or a series of recesses.

The outer cone member may be keyed to the driving member by any convenient means such as a further detent or detents.

One preferred embodiment of the present invention will now be particularly described by way of example with reference to the accompanying drawing in which:

The figure is a sectioned side elevation of a double cone friction clutch in accordance with the present invention.

A spindle 1 adapted to drive a work support (not shown) carries two driving members 3, 5, which are adapted to be driven by any suitable means at different speeds and/or in different directions or both as the case may require.

Each member 3, 5, is formed with an annular recess to accommodate a pair of friction cones, thus the member 3 accommodates an outer cone 7 and an inner cone 9, and the member 5 accommodates an outer cone 11 and an inner cone 13. Each outer cone 7, 11, is provided with an interrupted flange 15.

The periphery of each member 3, 5, is provided with a number of spaced holes 17. In each member 3, 5, one hole 17 is provided with a detent 21 urged by a spring 19 to contact an inner face of a lock-nut 27 through an interruption in the flange 15.

One hole 17 in each member 3, 5, is provided with a locking pin 23 coinciding with a further interruption in the flange 15, the head of such pin being of such dimensions as to fill the space thus provided in the flange.

The remaining holes 17 in each member are occupied by springs 25 which exert a spring loading on the flange 15 from the members.

The periphery of each member 3, 5, is provided with a threaded portion, the lock nut 27 being adapted to screw on to these threads.

Each lock-nut 27 is provided with a number of spaced countersunk holes 29, the countersinking of which is arranged to coincide with the shape of the heads of the detents 21. Each nut 27 is also provided with a number of apertures to allow the clearance between the flange 15 and the inner face of the lock nut 27, when its associated cones are engaged, to be determined.

The dimensions of the lock-nuts 27 are such that the flanges 15 of the outer cones are limited in movement, but no such restriction is applied to the inner cones 9, 13.

The two inner cones are secured to a bridge piece 33 which is provided with two apertures each formed with cam edges adapted to engage with rocking levers 35 which are arranged to be moved in concert by a yoke member 37.

The levers 35 are each formed with projecting lugs engaging in slots 39 in the work spindle 1.

The whole arrangement of levers 35, bridge pieces 33 and yoke 37 is arranged so that when the yoke 37 is centrally disposed between the members 3, 5, the rocking levers 35 are disposed parallel to the spindle 1, and the bridge piece 33 is also centrally disposed so that neither pair of cones is engaged.

When the yoke 37 is moved to the position illustrated in Fig. 1, the yoke depresses an end of each of the rocking levers 35 causing the end so depressed to engage with and displace axially the cam edges of apertures in the bridge piece 33.

Thus the bridge piece with its secured inner cones 9, 13, is moved axially along the spindle 1, over the bearing member 41.

In the position as illustrated, the cone 9 has been pulled out of contact with the cone 7, and the cones 11 and 13 pushed into contact. Thus the member 5 is clutched to the spindle 1. If the opposite member is required to be clutched, then the yoke member is moved in the opposite direction.

The inherent tendency for engaged cones to stick together is overcome by the lock-nut 27 which prevents the outer cone from following the inner cone during a disengaging operation.

The loading on the outer cone 11 is dependent upon the reaction of that cone to the load applied by the yoke. The reaction applied by the cone 11 depends solely upon the characteristic of the spring loading, that is, upon the number and type of the springs 25, and in any instance is predeterminable.

The lock-nuts 27 are adjusted so that with the cones engaged there is a clearance between the ends of adjacent faces of the nut 27 and the flanges 15. This adjustment may conveniently be varied by use of the holes 29 formed in the nuts 27, the nuts being turned to the desired position and the detents 21 serving to lock the nuts in that position. The apertures 31 may be used to determine the required clearance.

In use the drive is transmitted from the driving members 3, 5, through locking pins 23 to the outer cones 7, 11. The drive from the cones depends upon the position of the yoke and may be to the inner cone 9 or to the inner cone 13 or not at all. The drive when transmitted passes to the bridge piece 33 and to the spindle 1. The yoke 37 is permitted to rotate with the levers 35 during driving and is for this purpose provided with an integral bearing assembly so that the outer part of the yoke may remain motionless.

I claim:

1. In a conical friction clutch for providing a quick reverse or change of speed of rotation of the work spindle in automatic lathes, the combination of a pair of inner friction cones slidable axially on the work spindle, a pair of driving members rotatably but axially non-slidably mounted on said spindle adjacent to each inner cone, outer axially movable friction cones associated with said driving members and engageable with said inner cones for transmitting drive to said spindle, springs located in said driving members adapted to control the torque transmitted by said driving members by providing a resilient connection between said axially movable outer cones and said driving members, and lock-nuts associated with said driving members adapted to prevent axial movement of said outer cones relative to said inner cones in a direction away from the spring-loading of said outer cones.

2. In a conical friction clutch as defined in claim 1, including locking pins in the driving members adapted to engage with said outer friction cones for positively transmitting drive from said driving members to said friction cones.

3. In a conical friction clutch as defined in claim 1, wherein said lock-nuts and driving members have interconnecting threaded portions and said lock-nuts have series of spaced holes, and including spring-loaded detents in said driving members engageable in the holes in the lock-nuts to secure said lock-nuts in different adjusted positions relative to the outer friction cones through the interconnecting threaded portions on said driving members and lock-nuts.

References Cited in the file of this patent

UNITED STATES PATENTS

| Number | Name | Date |
|---|---|---|
| 1,266,189 | Younie | May 14, 1918 |
| 1,883,394 | Mosher | Oct. 18, 1932 |
| 2,057,876 | Berry | Oct. 20, 1936 |
| 2,129,361 | Ruesenberg | Sept. 6, 1938 |
| 2,208,747 | Campbell | July 23, 1940 |
| 2,443,901 | Fast | June 22, 1948 |
| 2,519,026 | Cuttat | Aug. 15, 1950 |